United States Patent
Markiewicz et al.

(10) Patent No.: US 11,718,323 B2
(45) Date of Patent: Aug. 8, 2023

(54) METHOD AND SYSTEM FOR MAPPING A PHYSICAL ENVIRONMENT USING AN OCCUPANCY GRID

(71) Applicant: APTIV TECHNOLOGIES LIMITED, St. Michael (BB)

(72) Inventors: Pawel Markiewicz, Cracow (PL); Jakub Porebski, Cracow (PL); Dominik Sasin, Cracow (PL)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 114 days.

(21) Appl. No.: 16/904,923

(22) Filed: Jun. 18, 2020

(65) Prior Publication Data

US 2020/0406929 A1    Dec. 31, 2020

(30) Foreign Application Priority Data

Jun. 28, 2019 (FR) ...................... 1907103

(51) Int. Cl.
*B60W 60/00* (2020.01)
*B60W 30/095* (2012.01)
(Continued)

(52) U.S. Cl.
CPC .... *B60W 60/0025* (2020.02); *B60W 30/0956* (2013.01); *G01S 13/89* (2013.01);
(Continued)

(58) Field of Classification Search
CPC ......... B60W 60/0025; B60W 30/0956; B60W 2420/52; G01S 13/89; G01S 17/89;
(Continued)

(56) References Cited

U.S. PATENT DOCUMENTS

| | | | |
|---|---|---|---|
| 2017/0269201 A1* | 9/2017 | Adachi | G01S 13/931 |
| 2020/0341486 A1* | 10/2020 | Dia | G05D 1/0253 |
| 2021/0390331 A1* | 12/2021 | Kellner | G01S 17/89 |

FOREIGN PATENT DOCUMENTS

| | | |
|---|---|---|
| EP | 3364213 A1 | 8/2018 |
| WO | 2019/068214 A1 | 4/2019 |

OTHER PUBLICATIONS

Search Report for Application No. FR 1907103, dated Feb. 26, 2020.

* cited by examiner

*Primary Examiner* — Hunter B Lonsberry
*Assistant Examiner* — Harrison Heflin
(74) *Attorney, Agent, or Firm* — Carlson, Gaskey & Olds, P.C.

(57) ABSTRACT

An illustrative example method of mapping a physical environment using an occupancy grid containing a set of cells associated with respective occupancy probabilities includes measuring a potential position of an object, using a sensor and identifying a segment representing a distribution interval of probable values associated with respective probability values relating to the measured potential position. The segment extends according to only one of two dimensions of the coordinate system of the sensor and penetrates a subset of potentially occupied cells. The method includes evaluating a probability of occupancy of each potentially occupied cell by determining the features of a segment portion included in the potentially occupied cell, and determining the probability of occupancy of the potentially occupied cell as a function of the determined segment portion using the probability density function.

4 Claims, 9 Drawing Sheets

(51) Int. Cl.
*G05D 1/02* (2020.01)
*G06F 17/18* (2006.01)
*G01S 13/89* (2006.01)
*G01S 17/89* (2020.01)

(52) U.S. Cl.
CPC .............. *G01S 17/89* (2013.01); *G05D 1/024* (2013.01); *G05D 1/0257* (2013.01); *B60W 2420/52* (2013.01); *G05D 2201/0213* (2013.01); *G06F 17/18* (2013.01)

(58) Field of Classification Search
CPC ................. G05D 1/024; G05D 1/0257; G05D 2201/0213; G06F 17/18
See application file for complete search history.

METHOD AND SYSTEM FOR MAPPING A PHYSICAL ENVIRONMENT USING AN OCCUPANCY GRID

CROSS-REFERENCE TO RELATED APPLICATIONS

This application claims priority to French Patent Application No. FR1907103, filed on Jun. 28, 2019.

TECHNICAL FIELD

The present description relates to the generation of maps of physical environments around sensors, particularly in the field of motor vehicles, in particular that of motor vehicles which are autonomous and/or fitted with one or more advanced driver assistance systems. The present description refers more specifically to a simplified method and a corresponding system for mapping a physical environment around a sensor, and also to a method for driving a motor vehicle fitted with the sensor and to the corresponding vehicle.

BACKGROUND

With the current development of motor vehicles which are autonomous and/or fitted with ADAS (Advanced Driver Assistance Systems), many techniques have been developed for the reliable estimation of the vehicle environment, on the basis of a large amount of data coming from one or more sensors of the vehicle, such as lidars and/or radars. A widely used approach consists in detecting objects or obstacles in the environment of the vehicle, using one or more sensors, then in converting the raw data from the sensors into an occupancy grid containing cells associated with respective occupancy probabilities. The occupancy probability of each cell is calculated using an algorithm called "Inverse Sensor Model" which converts the detected data and the additional information into occupancy probabilities. The sensors used are distance estimation sensors, for example radars and/or lidars.

The generation of such mapping in the form of an occupancy grid, in a motor vehicle environment, requires the processing of a very large amount of data in a short space of time. The complexity of the calculations and the execution time are crucial aspects for the obtainment of a robust method for establishing the occupancy of the cells on the grid representing the environment.

The present description has the aim of improving the situation, and in particular of simplifying the establishment of a map of the environment around a sensor.

SUMMARY

With this aim and in a first aspect, the present description relates to a method for mapping a physical environment using an occupancy grid containing a set of cells associated with respective occupancy probabilities. The method includes measuring, using at least one distance estimation sensor, a potential position of an object in the physical environment, during which the sensor provides, for the measured potential position, a first coordinate according to a first dimension and a second coordinate according to a second dimension in a coordinate system of the sensor having at least two dimensions. The method also includes identifying a segment representing a distribution interval of probable values relating to the measured potential position, which extends according to only one of the two dimensions of the coordinate system of the sensor. The probable values relate to the measured potential position associated with probability values given by a probability density function that can be represented by a curve having an apex which corresponds to the measured potential position. The identified segment penetrates a subset of potentially occupied cells of the occupancy grid. For each potentially occupied cell of the subset, the method includes evaluating a probability of occupancy of the potentially occupied cell by determining the features of a segment portion, included in the potentially occupied cell, calculating the probability of occupancy of the potentially occupied cell as a function of the determined segment portion, and using the probability density function.

The method makes it possible to provide information regarding an object of the environment, such as an obstacle, in order to evaluate the situation in the area surrounding the sensor. This information can then be used for determining a driving space of a motor vehicle and carrying out the planning of a journey.

The method makes it possible to reduce the complexity of the calculations for determining the occupancy probability values of the cells of the occupancy grid, in particular owing to the fact that the distribution of the probable values is carried out according to a single dimension of the coordinate system of the sensor. This results in less calculation work being necessary.

One of the two dimensions of the coordinate system of the sensor is chosen for identifying a segment as a function of features of the distance estimation sensor relating to a measurement uncertainty according to each of the two dimensions of the coordinate system of the sensor.

The coordinate system of the sensor is a polar coordinate system in which each point is represented by a distance and an azimuth and, in the case where the measurement uncertainty of the sensor is considered to be negligible in the azimuth dimension because it is below a predefined threshold, the segment representing a distribution interval of probable values relative to the measured potential position is a segment of the line defined by the potential measured position and an origin of the coordinate system of the sensor, the middle of such a segment corresponding to the potential measured position.

The coordinate system of the sensor is a polar coordinate system in which each point is represented by a distance and an azimuth and, in the case where the measurement uncertainty of the sensor is considered negligible in the distance dimension, because it is below a predefined threshold, the segment representing a distribution interval of probable values relative to the measured potential position is an arc of a circle.

The method may include an approximating step during which said arc of a circle is approximated by a line segment perpendicular to the direction of a line defined by the measured potential position and a point of origin of the coordinate system of the sensor. Such an approximation simplifies still further the calculations for processing the uncertainty of the azimuth by allowing a simplified and accurate identification of the potentially occupied cells.

For each potentially occupied cell of said subset, during the step of calculating the probability of occupancy of said potentially occupied cell, an approximation of said probability of occupancy is carried out by calculating the area of a rectangle, one of the dimensions of which corresponds to the length of the segment portion included in said potentially occupied cell, and the other dimension of which is an approximate probability value assigned to said potentially occupied cell.

The approximate probability value assigned to said potentially occupied cell is the probability value given by the probability density function at the midpoint of the segment portion included in said potentially occupied cell.

Thus, an additional simplification of the calculations relies on the replacement of the integration of the probability function over the distribution interval with an approximation of the integral to the area of a rectangle.

The sensor can be a lidar sensor, a radar sensor, a camera or another device that is able to measure data relating to the position of an object.

In the case where the sensor is a lidar sensor, or more generally a sensor with a high accuracy of azimuth measurement, the distance dimension is chosen for identifying the segment mentioned above.

In the case where the sensor is a radar sensor, or more generally a sensor with a high accuracy of distance measurement, the azimuth dimension is chosen for identifying the segment mentioned above.

A second aspect relates to a method for detecting an obstacle comprising the generation of a mapping of a physical environment by implementing the previously defined method and detecting an obstacle in the environment on the basis of the generated mapping.

A third aspect relates to a method for driving an autonomous motor vehicle or for assisting the driving of a motor vehicle fitted with at least one advanced driver assistance system, characterized in that it comprises an operation for generating a mapping of a physical environment of the vehicle by implementing the previously defined method.

A fourth aspect relates to a system for mapping a physical environment using an occupancy grid containing a set of cells associated with respective occupancy probabilities. The system includes a measuring device having at least one distance estimation sensor arranged to measure a potential position of an object in the physical environment and to provide, for the measured potential position, a first coordinate according to a first dimension and a second coordinate according to a second dimension in a coordinate system of the sensor having at least two dimensions. A segment identification module that identifies the segment representing a distribution interval of probable values relating to the measured potential position and extending according to only one of the two dimensions of the coordinate system of the sensor. The probable values relate to the measured potential position associated with probability values given by a probability density function that can be represented by a curve having an apex which corresponds to the measured potential position. A module for evaluating a probability of occupancy of each of a plurality of potentially occupied cells of the occupancy grid that are penetrated by the segment includes a unit for determining the features of a segment portion, included in the potentially occupied cell and a unit for calculating a probability of occupancy of the potentially occupied cell as a function of the segment portion determined, and using the probability density function.

A fifth aspect relates to a system for detecting an obstacle incorporating the system for mapping a physical environment as previously defined and a module for detecting an obstacle in said environment on the basis of the generated mapping.

A sixth aspect relates to a motor vehicle, which is autonomous or fitted with at least one advanced driver assistance system, incorporating a system as defined previously for mapping a physical environment of the vehicle using an occupancy grid containing a set of cells defined by respective occupancy probabilities.

BRIEF DESCRIPTION OF THE DRAWINGS

Other features and advantages of the present description will become more clearly apparent on reading the following detailed description which shows different embodiments given by way of examples that are in no way limiting. The description is accompanied by the appended figures wherein.

DETAILED DESCRIPTION

Figure 1:
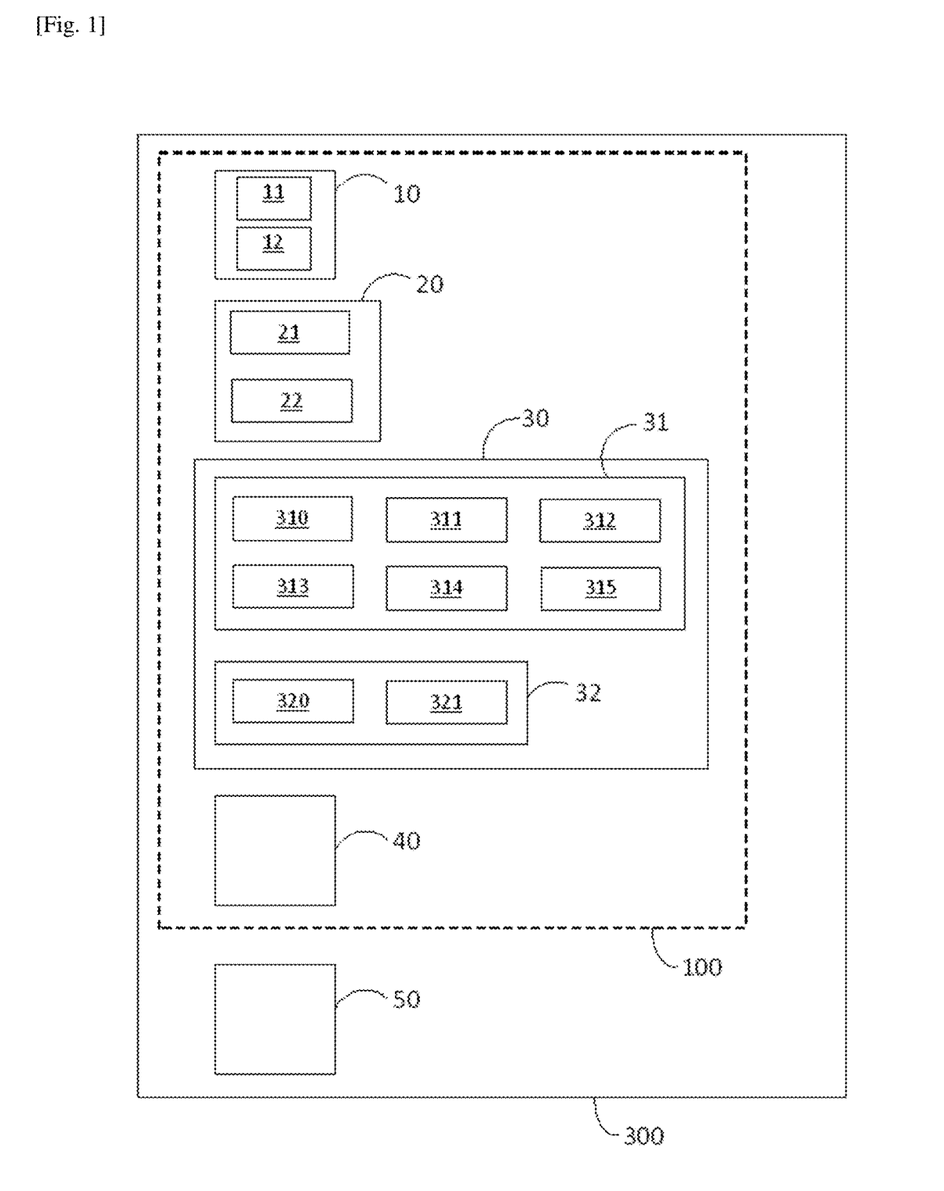
FIG. 1 represents a diagram of a system for mapping a physical environment using an occupancy grid containing a set of cells defined by respective occupancy probabilities, according to a particular embodiment.

FIG. 1 represents a particular exemplary embodiment of a system 100 for mapping a physical environment using an occupancy grid 200 containing a set of cells $g_{ij}$ that are assigned respective occupancy probabilities.

Figure 3:
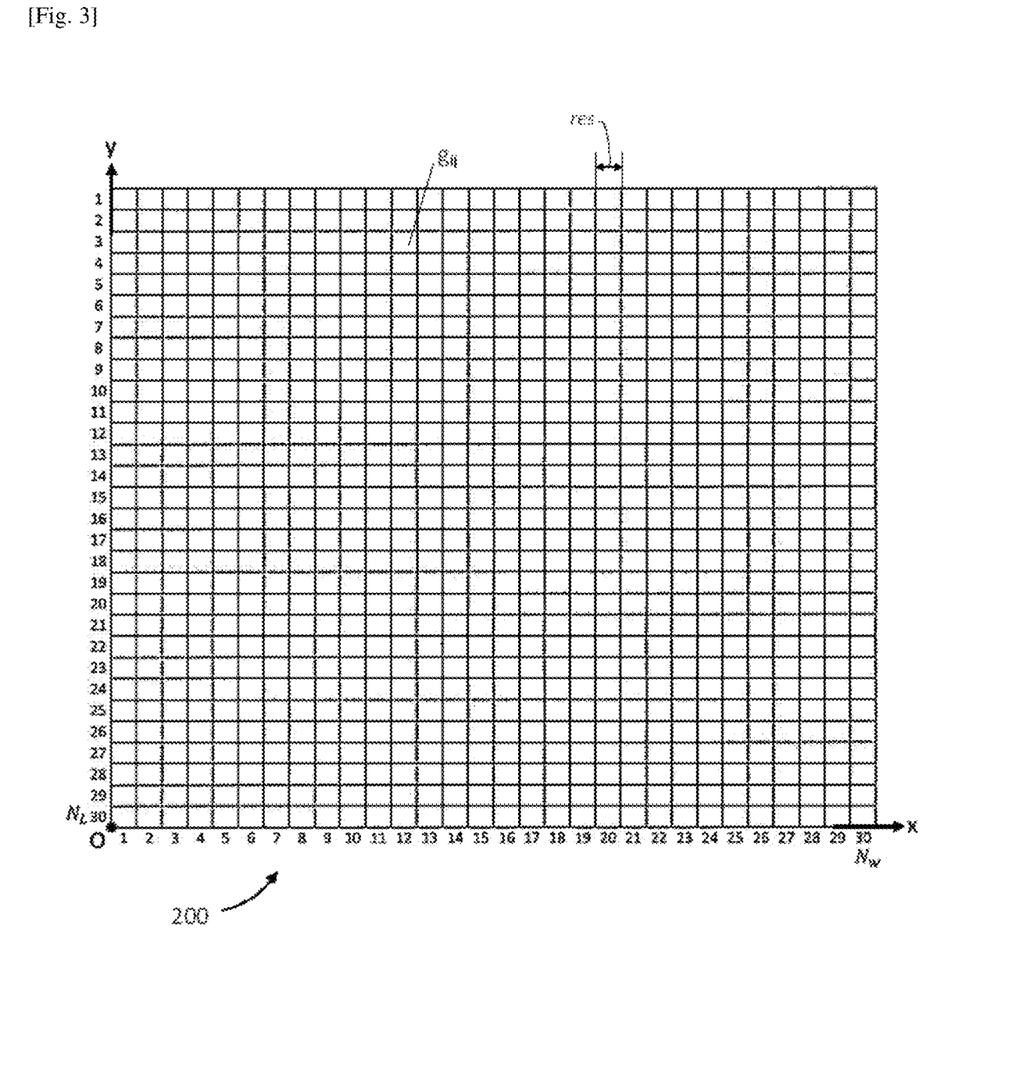
FIG. 3 represents a blank occupancy grid (without any occupied cells)

By way of illustrative example, FIG. 3 represents an occupancy grid 200 in two dimensions (x,y) in a coordinate system of the grid 200, for example a system of Cartesian coordinates. The occupancy grid 200 is used to tile or discretize a representation of the environment, in the form of a set of cells $g_{ij}$ disposed in rows and columns, as represented in FIG. 3. In this FIG. 3, the grid 200 is composed of $N_L \times N_W$ cells $g_{ij}$, of square shape and of the same dimension, forming a grid pattern. $N_W$ represents the number of cells $g_{ij}$ on the abscissa and $N_L$ represents the number of cells $g_{ij}$ on the ordinate. The point of origin O of the coordinate system of the grid 200 corresponds to the apex of origin of the grid 200 on the bottom left in FIG. 3. The spatial resolution, denoted res, of the grid 200 corresponds to the dimension of one side of a cell $g_{ij}$. One position on the grid 200 can be described in the Cartesian coordinate system of the grid by physical distances on the abscissa x and on the ordinate y, for example expressed in meters. Each cell $g_{ij}$ occupies a given position in the grid 200, which is known and defined by an index i, here between 1 and $N_L$, and an index j, here between 1 and $N_W$.

The system 100 is for example integrated into a motor vehicle (not represented) and makes it possible to establish a mapping in the area surrounding the vehicle in the form of an occupancy grid 200, similar to that in FIG. 3, the cells of which are associated with respective occupancy probabilities. These occupancy probabilities are for example values between 0 and 1, the value "0" corresponding to an unoccupied cell and the value "1" corresponding to a cell that is definitely occupied (occupancy probability of 100%, in other words equal to 1).

The system 100 comprises a measuring device 10 for measuring a potential position μ of an object (such as an obstacle), a module 20 for identifying a segment corresponding to a distribution interval of probable values (or probable positions) of the measured potential position μ, a module 30 for evaluating occupancy probabilities of cells of the grid 200 and a module 40 for generating an occupancy grid 200.

The measuring device 10 comprises at least one distance estimation sensor 11 and a memory for storing measured raw data. The sensor 11 is arranged to measure a position of an object (such as an obstacle) of the physical environment of the sensor 11 and to provide, for the measured position, measured data comprising a first coordinate, according to a first dimension, and a second coordinate, according to a second dimension, in a coordinate system of the sensor with at least two dimensions. For example, the coordinate system of the sensor 11 is a system of polar coordinates in which each point is represented by a distance r and an azimuth (angle) a with respect to a polar axis (equivalent to the abscissa axis x in Cartesian coordinates, in the coordinate system of the grid 200). In this case, the sensor 11 measures and provides data of a detected position comprising a distance r and an azimuth α. The data thus measured is stored, at least temporarily, in the memory 12.

The identification module 20 is intended to identify a segment S (or a section of a line), representing a distribution interval of probable values relating to the measured potential position u, which extends according to only one of the two dimensions of the coordinate system of the sensor. Thus, the segment S extends either in distance (with a fixed azimuth), or in azimuth (with a fixed distance). The distribution interval, graphically represented by the segment S, represents an uncertainty on the measured position μ according to only one of the two dimensions of the coordinate system of the sensor 11, i.e. here either the uncertainty on the measured distance r, or the uncertainty on the measured azimuth α. The processing of the measurement uncertainty according to only one of the dimensions, neglecting the dimension in which the sensor 11 offers a high measurement accuracy, makes it possible to significantly reduce the complexity of the calculations for determining the occupancy probability values of the cells of the occupancy grid, while making it possible to carry out accurate calculations.

The evaluation module 30 is intended to evaluate a probability of occupancy of each of a plurality of potentially occupied cells $c_i$ of the occupancy grid 200, these cells $c_i$ being those penetrated by the segment S identified by the identification module 20, with $1 \leq i \leq N$ and N being the total number of cells penetrated by the segment S. The evaluation module 30 comprises: a unit 31 for determining features of a segment portion $x_i$, included in each of the potentially occupied cells $c_i$; and a unit 32 for calculating a probability of occupancy of each of the potentially occupied cells $c_i$ as a function of the segment portion $x_i$ determined and using a probability density function $\varphi$.

The mapping system 100 can be integrated into a system 300 for detecting an obstacle comprising, in addition to the elements 10, 20, 30 and 40 of the system 100, a module 50 for detecting an obstacle using the generated mapping of the environment, i.e. the grid of cells $g_{ij}$ respectively associated with occupancy probabilities.

Figure 2:
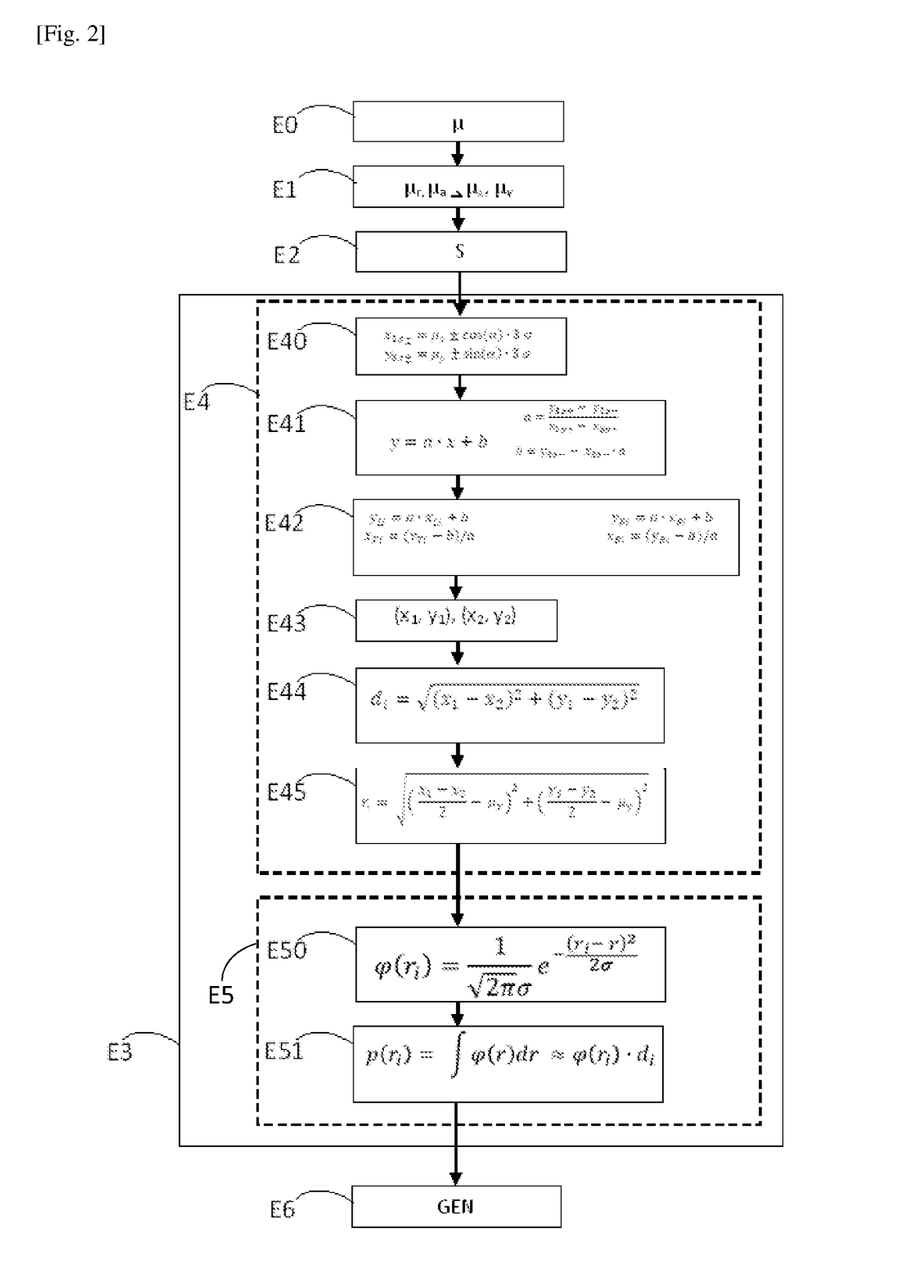
FIG. 2 represents a block diagram of a method for mapping a physical environment using an occupancy grid containing a set of cells defined by respective occupancy probabilities, according to a particular embodiment.

There will now follow a description, with reference to FIG. 2, of a method for mapping the physical environment of the sensor 11 using an occupancy grid 200 containing a set of cells $g_{ij}$ associated with respective occupancy probabilities, according to a particular embodiment. The method is implemented by the system 100.

The method first comprises a step E0 of measuring, here using the distance estimation sensor 11, a potential position μ of an object in the physical environment of the sensor. The sensor 11 is for example a radar or a lidar or any other sensor appropriate for evaluating a distance between itself and an object or obstacle of the environment. During the measurement step E0, the sensor 11 provides, for the measured potential position μ, a first coordinate, according to a first dimension, and a second coordinate, according to a second dimension, in a coordinate system of the sensor 11 with two dimensions. In the example described here, the coordinate system of the sensor 11 is a system of polar coordinates in two dimensions in which each point is represented by a distance r and an azimuth α with respect to a polar axis (equivalent to the abscissa axis in Cartesian coordinates, in the coordinate system of the grid 200). The sensor 11 provides a distance coordinate $\mu_r$ and an azimuth coordinate $\mu_\alpha$ to the point, the potential position μ of which is measured by the sensor 11.

In a step E1 of converting coordinates, a number of Cartesian coordinates $\mu_x$ and $\mu_y$ of the measured potential position μ in the coordinate system of the occupancy grid 200 are calculated, on the basis of polar coordinates of distance $\mu_r$ and azimuth $\mu_\alpha$ of the measured potential position μ and of the known position of the sensor 11 in the Cartesian coordinate system of the sensor of the grid 200 (this position being defined by Cartesian x and y coordinates of the sensor 11 in the coordinate system of the grid 200). The step E1 is implemented by a conversion unit 21 of the identification module 20.

Figure 4:
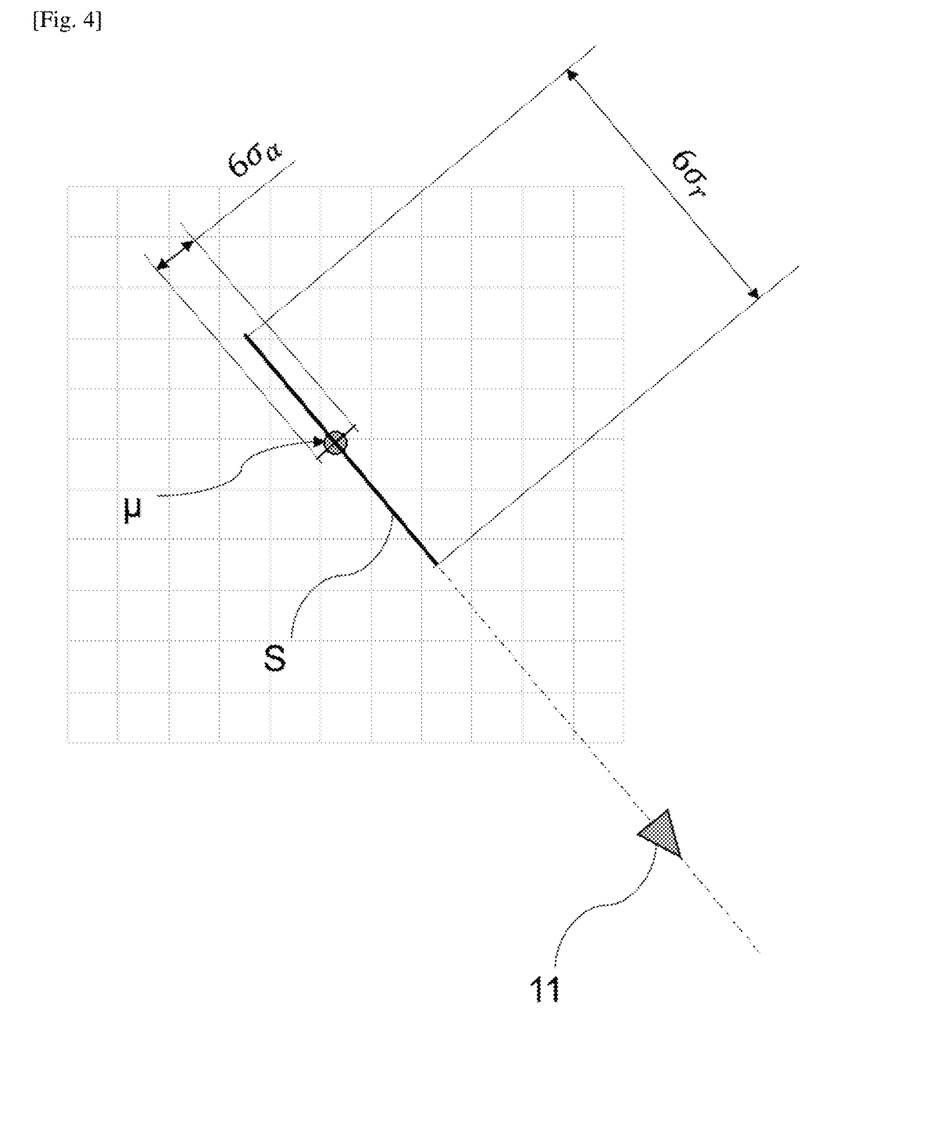
FIG. 4 represents a sensor, at a point corresponding to a potential position measured by the sensor and a distribution interval of probability values relating to the potential measured position in a dimension of distance of a coordinate system of the sensor.
Figure 5:
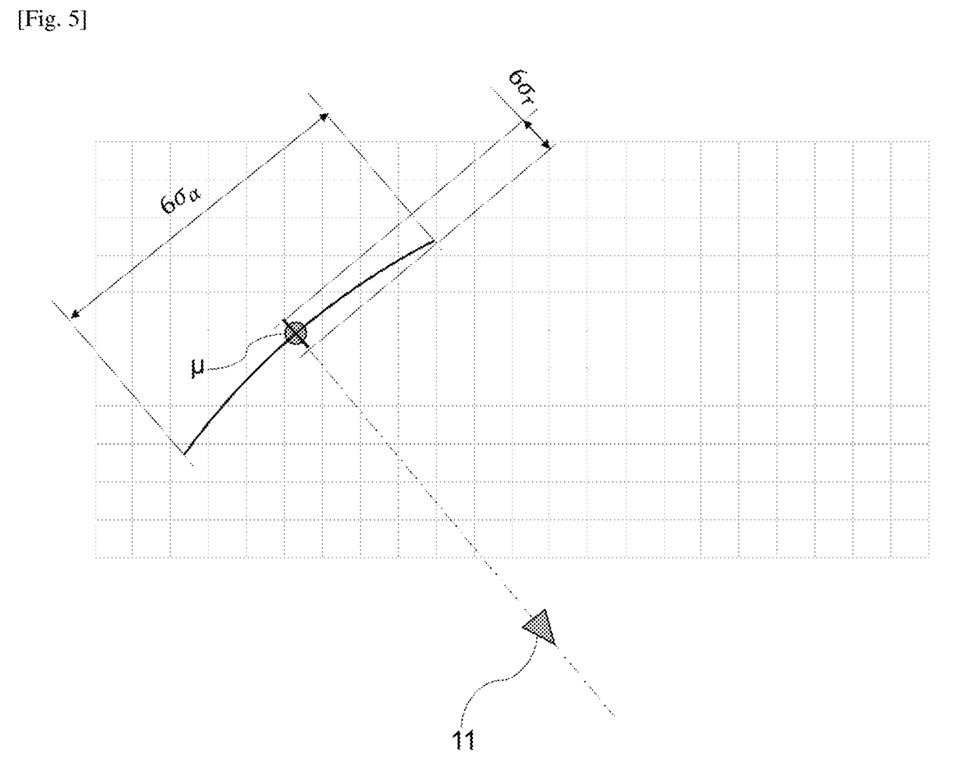
FIG. 5 represents a sensor, a point corresponding to a potential position measured by the sensor and a distribution interval of probability values relating to the potential measured position in an azimuth dimension of a coordinate system of the sensor.

The method also comprises a step E2 of identifying a segment S representing a distribution interval of probable values relating to the measured potential position μ. During this step E2, a calculation unit 22 of the identification module 20 determines a distribution interval of probable values relating to the measured potential position µ. This distribution interval corresponds to a set of probable positions of the point, the potential position µ of which has been measured by the sensor 11. Specifically, due to the features of the sensor 11, in particular the accuracy of distance and azimuth measurement of the sensor 11, an uncertainty exists on the values of the coordinates of the position measured by the sensor 11. In the coordinate system of the sensor 11, the distribution interval can be represented by a segment S, as represented in FIGS. 4 and 5. This segment extends according to a single one of the two dimensions of the coordinate system of the sensor 11. In other words, in the example described here, the segment S is defined either by a bounded interval of distances and a given azimuth (FIG. 4), or by a bounded angular interval and a given distance (FIG. 5). It can therefore be either a portion of a straight line (FIG. 4), in the case of a segment extending only in the distance dimension r, or an arc of a circle (FIG. 5), in the case of a segment extending only in the angular dimension α.

In the first case (FIG. 4), the probable values relating to the measured potential position µ comprise a range of distances r associated with a fixed azimuth value. The distance in the middle of this range and the associated azimuth are the polar coordinates of the measured potential position µ in the coordinate system of the sensor 11.

In the second case (FIG. 5), the probable values relating to the measured potential position µ comprise a range of angles α associated with a fixed distance value. The angle in the middle of this range and the associated distance are the polar coordinates of the measured potential position µ in the coordinate system of the sensor 11.

Figure 6:
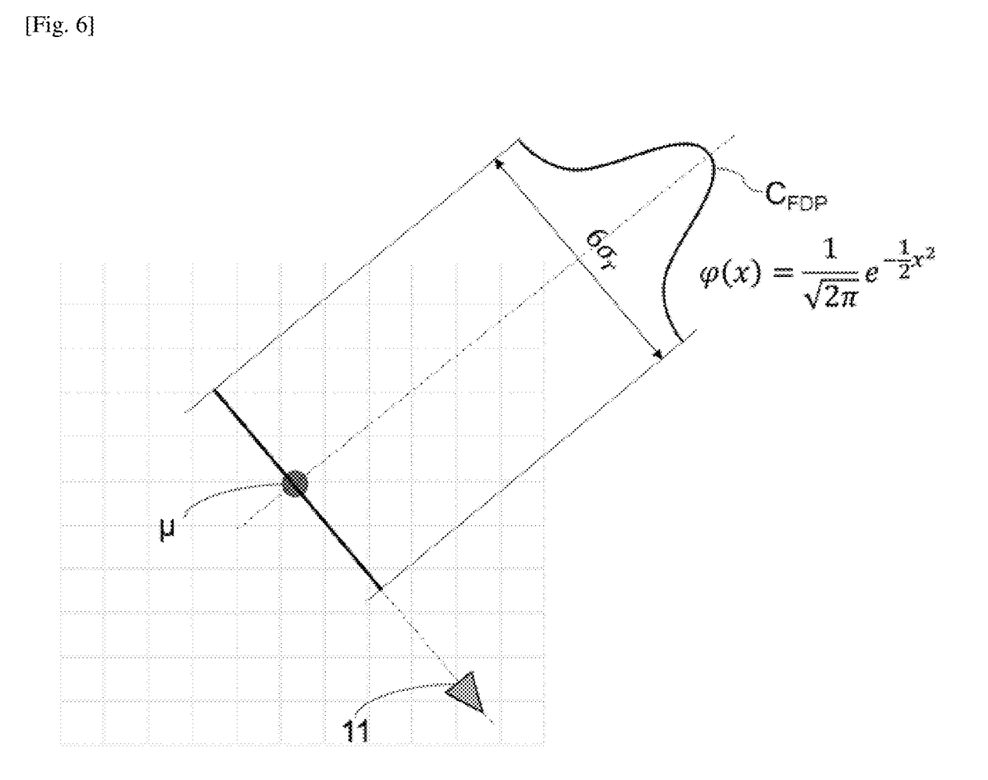
FIG. 6 represents the sensor and the measured point of FIG. 4, with a curve representing a probability density function for the distance dimension of the distribution interval.

The probable values relating to the measured potential position µ are associated with probability values given by a probability density function φ. The probability value of a point of the segment S represents the probability that the detection (i.e. the object detected by the sensor 11) is positioned at this point. The probability density function φ can be graphically represented by a curve $C_{FDP}$ which associates probability values with each of the values of the distribution interval, graphically represented by the segment S. In FIG. 6, by way of illustrative example, is a graphic representation of the curve $C_{FDP}$ associated with the segment S of FIG. 4. In this example, the probability density function φ is a Gaussian function. Another type of probability density function could be chosen. The curve $C_{FDP}$ has an apex which corresponds to the measured potential position µ. In other words, the apex of the curve $C_{FDP}$ is the image of the measured position µ by the probability density function φ. Preferably, the curve $C_{FDP}$ is symmetrical with respect to a central axis passing through its apex. For example, the probability density function φ is expressed by the following relationship:

$$\varphi(x) = \frac{1}{\sqrt{2\pi}} e^{-\frac{1}{2}x^2}$$

where x represents a distance from the point of detection µ (detected potential position) along the axis connecting said point µ and the sensor 11.

The length of the segment S (in other words the width of the distribution interval) is chosen in such a way that the sum of the probability values associated with each of the points of the segment (in other words the integral of the probability density function φ over the distribution interval) is greater than or equal to a target probability value, for example 0.99.

For example, "σ" denoting the standard deviation of the probability density function φ, the width of the distribution interval is chosen as equal to 6σ The standard deviation is denoted $\sigma_r$ in the case where the uncertainty on the azimuth is negligible (FIG. 4) and $\sigma_\alpha$ in the case where the uncertainty on the distance is negligible (FIG. 5). In FIGS. 4 to 6, the symbols $\sigma_\alpha$ and $\sigma_r$ represent the standard deviation of the probability density function φ relating to the azimuth measurement α and the standard deviation of the probability density function φ relating to the distance measurement, respectively.

One of the two dimensions of the coordinate system of the sensor 11 is chosen—i.e. either the distance (FIG. 4) or the azimuth (FIG. 5)—for implementing the step of identifying a segment, as a function of features of the sensor 11 relating to a measurement uncertainty according to each of the two dimensions of the coordinate system of the sensor 11.

In the case where the measurement uncertainty of the sensor 11 is considered to be negligible in the azimuth dimension, because it is below a predefined threshold ($6\sigma^\alpha$<res), the segment S representing a distribution interval of probable values relating to the measured potential position µ is a segment of the straight line defined by the measured potential position µ and an origin of the coordinate system of the sensor, the middle of said segment corresponding to the measured potential position µ. Thus, the distance dimension is chosen to identify a segment S such as that of FIG. 4.

Figure 7:
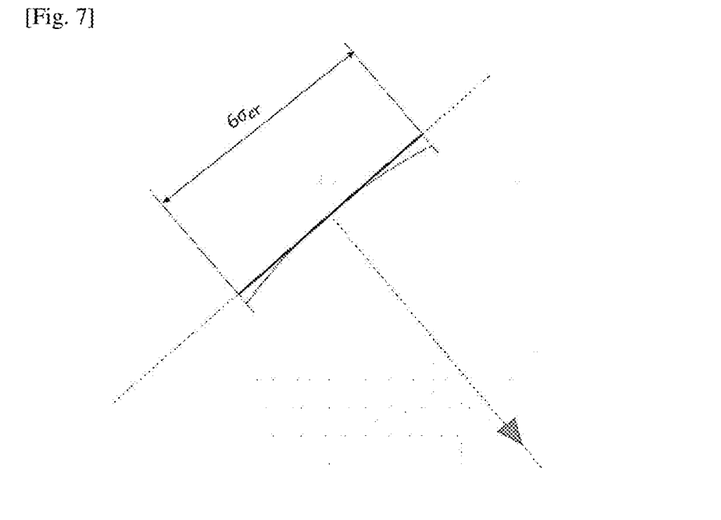
FIG. 7 represents an approximation of the distribution interval of FIG. 5.

In the case where the measurement uncertainty of the sensor 11 in the distance dimension is considered to be negligible, because it is below a predefined threshold (for example $6\sigma_r$<res), the segment representing a distribution interval of probable values relating to the measured potential position µ is an arc of a circle. Thus, the azimuth dimension is chosen to identify a segment S such as that represented in FIG. 5. In this case, the method can advantageously comprise an approximating step during which the arc of a circle corresponding to the segment S is approximated by a line segment which is perpendicular to the direction of a line defined by the measured potential position µ and a point of origin of the coordinate system of the sensor 11 (this point of origin representing the sensor 11 itself), as represented in FIG. 7. Such an approximation simplifies the calculations for processing an azimuth uncertainty by allowing a simplified and accurate identification of the potentially occupied cells.

In the case where the sensor 11 is a lidar, the distance dimension is chosen for the identification of the segment S (FIG. 4). In the case where the sensor 11 is a radar, the azimuth dimension is chosen for the identification of the segment S (FIG. 5).

As shown in FIGS. 4 and 5, the identified segment S penetrates a subset of potentially occupied cells of the occupancy grid 200, denoted $c_i$ with i ranging from 1 to N in the present description. For each potentially occupied cell $c_i$ of this subset, a step E3 of evaluating a probability of occupancy of this potentially occupied cell is implemented. The evaluating step E3 comprises a step E4 of determining features of a portion $x_i$ of the segment S, included in said potentially occupied cell $c_i$ of index i;

a step E5 of calculating the probability of occupancy of said potentially occupied cell of index i as a function of the features of the determined segment portion and using the probability density function φ.

The step E4 of determining a portion $x_i$ of the segment S makes it possible to determine features of the segment portion $x_i$, for example the length of the segment portion $x_i$ and the distance $r_i$ between the middle of the segment portion $x_i$ and the measured point μ. It comprises the calculating steps E40 to E45 described below, implemented by the determination module 31.

The abscissa and ordinate coordinates of the measured potential position μ are denoted $μ_x$ and $μ_y$, in the coordinate system of the grid 200. The coordinates of the two ends of the segment S, denoted for example μ+3σ and μ−3σ, in the coordinate system of the grid 200 are calculated using the Bresenham segment tracing algorithm (with an extension of neighbor status to 4 cells), in the step E40. These coordinates can be expressed by the following relationship.

$$x_{3σ±}=μ_x±\cos(α)·3σ$$

$$y_{3σ±}=μ_y±\sin(α)·3σ$$

where a represents the azimuth of the point μ and σ represents the standard deviation of the probability density function φ used. The step E40 is implemented by a first calculation unit 310 of the determination module 31.

During the step E41, the coefficients a and b of the linear equation $$y=a·x+b,$$

which defines the straight line that contains the segment S in the coordinate system of the grid 200, are calculated by the unit 31, based on the coordinates of the ends of the segment S calculated during the step E40, using the following relationships:

$$a = \frac{y_{3σ+} - y_{3σ-}}{x_{3σ+} - x_{3σ-}}$$

$$b = y_{3σ-} - x_{3σ-} \cdot a$$

The step E41 is implemented by a second calculation unit 311 of the determination module 31.

Figure 8A:
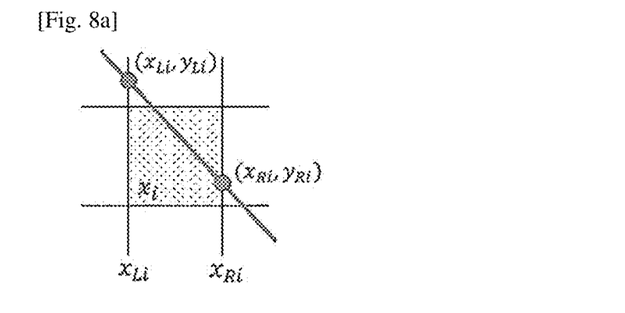
FIG. 8a represents a cell of the occupancy grid of FIG. 3, traversed by a segment corresponding to the distribution interval of FIG. 4 or 5, and two points of intersection.
Figure 8B:
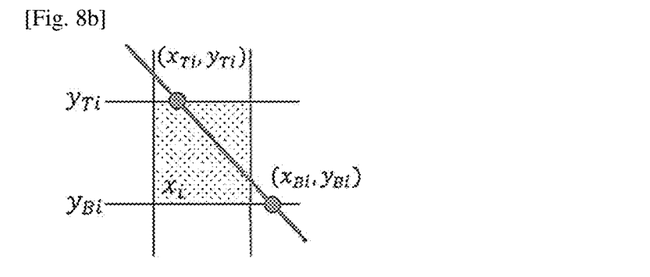
FIG. 8b represents the cell of FIG. 8a and two other points of intersection.

Then, during a step E42, the unit 31 determines each of the points of the segment S constituting the intersections between the cell borders and the straight line determined during step E41, using the following relationships:

$$y_{Li}=a·x_{Li}+b \quad y_{Ri}=a·x_{Ri}+b$$

$$x_{Ti}=(y_{Ti}-b)/a \quad x_{Bi}=(y_{Bi}-b)/a$$

where $x_{Li}$, $x_{Ri}$, $y_{Ti}$, $y_{Bi}$ respectively represent the fixed coordinates of the two vertical lines, left and right, and the two horizontal lines, top and bottom, defining the borders of a cell of index i, as represented in FIGS. 8a and 8b. The step E42 is implemented by a third calculation unit 312 of the determination module 31.

Figure 8C:
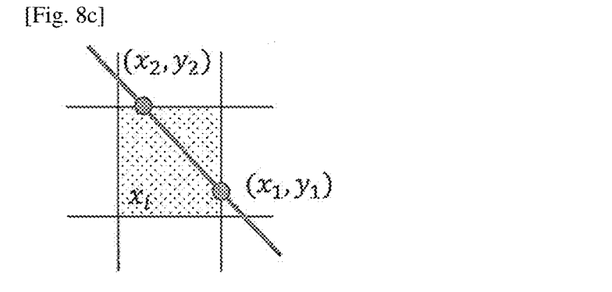
FIG. 8c represents the cell of FIGS. 8a and 8b and two selected points of intersection.

During a step E43, the unit 31 selects the two points of intersection which are located at the border of the considered cell of index i represented in FIG. 8c. These two points of intersection are denoted $(x_1, y_1)$ and $(x_2, y_2)$. The step E43 is implemented by a selection unit 313 of the determination module 31.

During a step E44, the unit 31 calculates the length $d_i$ of the segment portion S included in the cell of index i, using the following equation:

$$d_i = \sqrt{(x_1-x_2)^2+(y_1-y_2)^2}$$

The step E44 is implemented by a fourth calculation unit 314 of the determination module 31.

During a step E45, the determination module 31 calculates the distance $r_i$ between the middle of the segment portion of index i and the measured point μ, using the following equation:

$$r_i = \sqrt{\left(\frac{x_1 - x_2}{2} - μ_x\right)^2 + \left(\frac{y_1 - y_2}{2} - μ_y\right)^2}$$

The step E45 is implemented by a fifth calculation unit 315 of the determination module 31.

The step E5 of calculation of the probability of occupancy of the potentially occupied cell of index i as a function of the features of the determined segment portion $x_i$ and using the probability density function φ will now be described. It is implemented by the calculation module 32 and illustrated by FIGS. 9 and 10.

Figure 9:
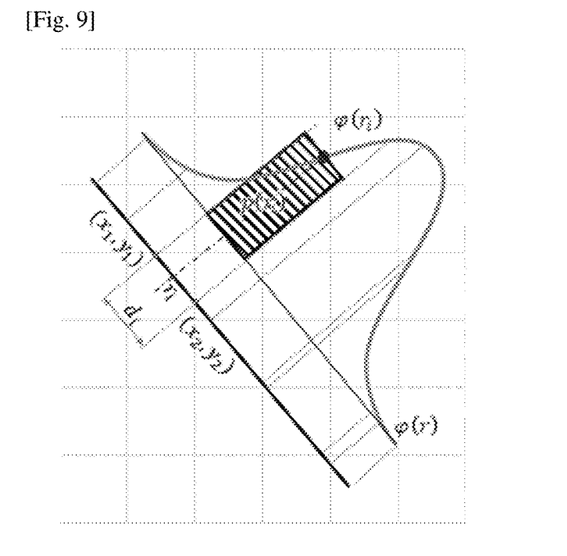
FIG. 9 represents a segment, corresponding to the distribution interval of FIG. 4 or 5, and an associated curve representing a probability density function applied to the points of the distribution interval, as well as a rectangle, the surface area of which corresponds to the approximate probability of occupancy of a cell.
Figure 10:
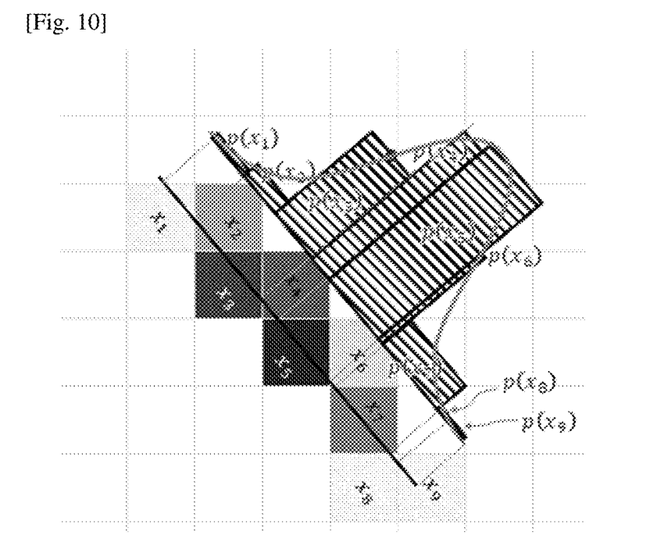
FIG. 10 is a more detailed representation of FIG. 9, including a representation of all the cells traversed by the segment corresponding to the distribution interval of FIG. 4 or 5, and associated with respective calculated occupancy probabilities.

This calculating step E5 comprises a first step E50 of determining an approximate probability value associated with the cell of index i. For example, the approximate probability value is equal to the probability value associated with the midpoint of the segment portion $x_i$ (given by the probability density function φ), here according to the equation:

$$φ(r_i) = \frac{1}{\sqrt{2π}\,σ}e^{-\frac{(r_i-r)^2}{2σ^2}}$$

where r here represents a variable describing the distance along the axis connecting said detection point μ (detected potential position) and the sensor 11 (same axis as that previously defined in relation with the variable "x") and $r_i$ is a value at the center of the segment portion of index i ($x_i$), as represented in FIG. 9. This step E50 is implemented by a first calculation unit 320 of the calculation module 32.

The calculating step E5 comprises a second step E51 of evaluating the probability of occupancy of the cell of index i, denoted $p(r_i)$, by the following approximation equation:

$$p(r_i)=\int φ(r)dr ≈ φ(r_i)·d_i$$

This step E51 is implemented by a second calculation unit 321 of the calculation module 32.

Thus, the unit 32 calculates an approximation of the probability of occupancy $p(r_i)$ of the cell of index i, by calculating the area of a rectangle, one of the dimensions of which corresponds to the length of the segment portion included in said potentially occupied cell, and the other dimension of which is an approximate probability value $φ(r_i)$ attributed to the potentially occupied cell of index i. This allows an additional simplification of the calculations based on a replacement of the integration of the probability density function φ over the distribution interval (segment S) by an approximation of the integral (result of this integration) to the area of a rectangle.

Figure 11:
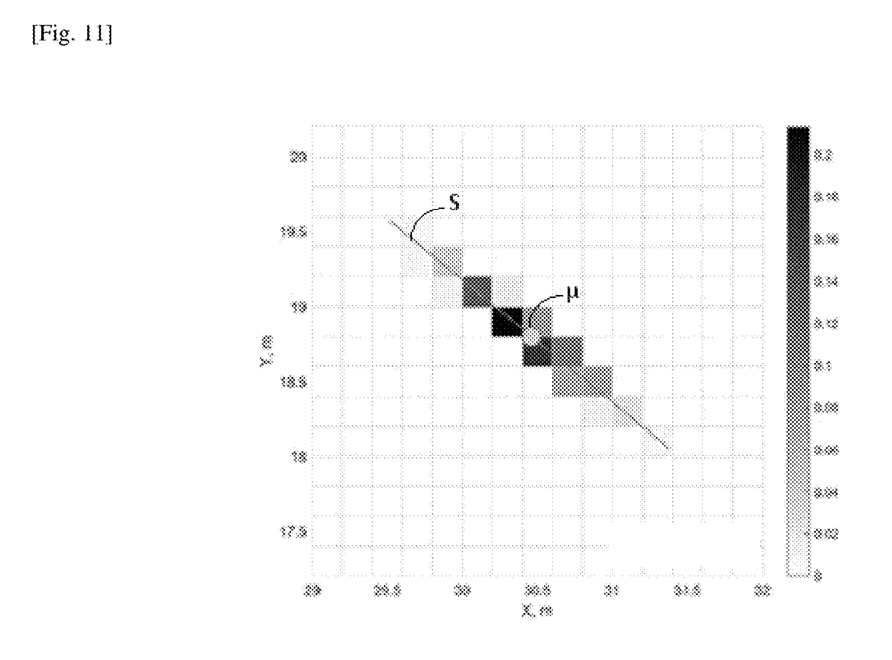
FIG. 11 represents only the occupancy grid obtained on the basis of the calculated occupancy probabilities as represented in FIG. 10.

The method then comprises a step E6 of generating an occupancy grid 200 on which the respective occupancy probabilities of the cells are represented for example by different colors. For example, a cell having a zero probability of occupancy is white and the cells having a non-zero probability of occupancy are represented in levels of gray, the darker the cell, the higher the probability of occupancy. FIG. 11 represents the occupancy grid 200 obtained based on the occupancy probabilities calculated and represented in FIG. 9.

During a testing step, it is possible to check whether or not the sum of the probability of occupancy values of the potentially occupied cells is close to 1. Experimental results give a total probability value equal to 0.99476 for the entirety of the cells traversed by the segment S.

In a second aspect, the present description relates to a method for detecting an obstacle comprising the generation of a mapping of a physical environment by implementing the method that has just been described and a step of detecting an obstacle in said environment on the basis of the generated mapping.

In a third aspect, the present description relates to a method for driving an autonomous motor vehicle or for assisting the driving of a motor vehicle fitted with at least one advanced driver assistance system, which comprises an operation of generating a mapping of a physical environment of the vehicle by implementing the method described previously.

In a fourth aspect, the present description also relates to a system of detection of an obstacle incorporating the system 100 for mapping a physical environment and a module of detection of an obstacle in said environment on the basis of the generated mapping.

In a fifth aspect, the present description also relates to a motor vehicle which is autonomous or fitted with at least one advanced driver assistance system, incorporating a system 100 for mapping a physical environment of said vehicle using an occupancy grid containing a set of cells defined by respective occupancy probabilities.

The measurement device 10 could comprise several distance estimation sensors.

The system 100 is for example integrated into at least one advanced driver assistance system and the modules and units described above are embodied in at least one processor or computing device configured to perform the respective functions of the modules and units described above. Example embodiments include at least one processor or computing device of the type known by those skilled in the art familiar with advanced driver assistance systems and functions of such systems related to establish a mapping in the area surrounding a vehicle.

Although the subjects of the present description have been described with reference to specific examples, various obvious modifications and/or improvements could be made to the embodiments described.

We claim:

1. A system for mapping a physical environment using an occupancy grid containing a set of cells associated with respective occupancy probabilities, the system comprising:
   a measuring device including at least one distance estimation sensor arranged to measure a potential position of an object in the physical environment and to provide, for the measured potential position, a first coordinate according to a first dimension and a second coordinate according to a second dimension in a coordinate system of the sensor having at least two dimensions;
   a segment identification module configured to identify a segment representing a distribution interval of probable values relating to the measured potential position and extending according to only one of the two dimensions of the coordinate system of the sensor, the probable values relating to the measured potential position associated with probability values given by a probability density function that can be represented by a curve having an apex which corresponds to the measured potential position; and
   a module configured to evaluate a probability of occupancy of each of a plurality of potentially occupied cells of the occupancy grid, penetrated by the segment, the module including
   a unit for determining the features of a segment portion included in the potentially occupied cell, and
   a unit for determining a probability of occupancy of the potentially occupied cell as a function of the segment portion and using the probability density function.

2. A system for detecting an obstacle, comprising
   the system for mapping a physical environment of claim 1 and
   a module for detecting an obstacle in the environment on the basis of the generated mapping.

3. An autonomous motor vehicle comprising the system of claim 1, wherein the physical environment is an environment in a vicinity of the motor vehicle.

4. A motor vehicle, comprising
   at least one advanced driver assistance system, and
   the system of claim 1, wherein the physical environment is an environment in a vicinity of the motor vehicle.

* * * * *